United States Patent [19]

Crocker

[11] Patent Number: 5,684,700
[45] Date of Patent: Nov. 4, 1997

[54] ADAPTIVE STEERING CONTROL USING VEHICLE SLIP ANGLE AND STEERING RATE

[75] Inventor: Jonathan Andrew Crocker, Dearborn, Mich.

[73] Assignee: Ford Global Technologies, Inc., Dearborn, Mich.

[21] Appl. No.: 567,615

[22] Filed: Dec. 5, 1995

[51] Int. Cl.⁶ .................................................. B62D 5/00
[52] U.S. Cl. .................... 364/424.051; 180/410; 180/422; 180/446
[58] Field of Search ........... 364/424.051, 424.052, 364/424.054, 424.058, 426.01, 426.037, 426.015, 426.016; 180/410–415, 421, 422, 443, 446

[56] References Cited

U.S. PATENT DOCUMENTS

| | | | |
|---|---|---|---|
| 4,541,499 | 9/1985 | Yanai et al. | 180/142 |
| 4,593,955 | 6/1986 | Leiber | 303/106 |
| 4,666,011 | 5/1987 | Ohe et al. | 180/79.1 |
| 4,715,463 | 12/1987 | Shimizu | 180/79.1 |
| 4,837,692 | 6/1989 | Shimizu | 364/424.05 |
| 4,909,343 | 3/1990 | Mouri et al. | 180/142 |
| 4,941,097 | 7/1990 | Karnopp et al. | 364/424.05 |
| 4,967,865 | 11/1990 | Schindler | 180/79.1 |
| 5,010,488 | 4/1991 | Ohshita et al. | 364/424.052 |
| 5,072,803 | 12/1991 | Kilian et al. | 180/141 |
| 5,078,226 | 1/1992 | Inagaki et al. | 180/141 |
| 5,159,553 | 10/1992 | Karnopp et al. | 364/424.05 |
| 5,189,613 | 2/1993 | Karnopp | 364/424.05 |
| 5,204,815 | 4/1993 | Yamamoto | 364/424.058 |
| 5,228,757 | 7/1993 | Ito et al. | 364/426.01 |
| 5,267,160 | 11/1993 | Ito et al. | 180/412 |
| 5,311,431 | 5/1994 | Cao et al. | 364/424.05 |
| 5,313,389 | 5/1994 | Yasui | 364/424.05 |
| 5,371,677 | 12/1994 | Ehret et al. | 364/426.02 |
| 5,386,365 | 1/1995 | Nagaoka | 364/424.054 |
| 5,388,896 | 2/1995 | Hartmann et al. | 303/111 |
| 5,401,082 | 3/1995 | Fuchs et al. | 303/111 |
| 5,402,341 | 3/1995 | Liubakka et al. | 364/424.05 |
| 5,402,342 | 3/1995 | Ehret et al. | 364/424.05 |
| 5,460,235 | 10/1995 | Shimizu | 180/79.1 |
| 5,627,756 | 5/1997 | Fukada et al. | 364/426.01 |

OTHER PUBLICATIONS

Nakamura et al., *Power Steering System with Travelling Condition Judgement Function*, 891980.

Yuhara et al., *Improvement of Vehicle Handling Quality Through Active Control of Steering Reaction Torque*, AVEC '92, Sep. 1992, pp. 407–412.

*Primary Examiner*—Gary Chin
*Attorney, Agent, or Firm*—Roger L. May; Gregory P. Brown

[57] ABSTRACT

A method and apparatus are provided for improving vehicle steering in unfamiliar safety critical situations by controlling power steering assist in response to the slip angle of the vehicle and the steering rate of the vehicle. When a vehicle is in a slide or a slide is imminent, the steering wheel should be turned in the direction of the slide to stabilize the vehicle and take the vehicle out of the slide or possibility of a slide. Accordingly, a positive supplemental steering assist is provided for the steering system if the driver is turning the steering wheel in the direction to correct the slide. If, on the other hand, the driver is turning the steering wheel in the direction which will increase the slide, a negative supplemental assist is provided for the steering system. That is, a feedback is provided to the driver in the form of increased steering assist if the steering wheel is being turned in the proper direction and a decreased steering assist if the steering wheel is being turned in the improper direction. In this way, the driver of a motor vehicle is advised of the proper steering action to take in the event of an actual or imminent vehicle slide by the resistance the driver feels in turning the steering wheel.

20 Claims, 3 Drawing Sheets

ADAPTIVE STEERING CONTROL USING VEHICLE SLIP ANGLE AND STEERING RATE

BACKGROUND OF THE INVENTION

The present invention relates in general to a motor vehicle steering system and, more particularly, to a method and apparatus for controlling steering assist, in response to vehicle slip angle and steering rate, to help a driver of the vehicle in unfamiliar safety critical situations.

A common procedure for improving steering stability involves controlling the angle of the steerable wheels of a vehicle in response to a comparison of the actual and desired vehicle yaw rates to conform the actual yaw rate to the desired yaw rate. However, to achieve steering correction, a steering motor must be provided to steer the wheels independent of the vehicle steering wheel. The steering motor may be a mechanical actuator or a hydraulic or electric torque motor which generates a counter steering force applied to the steering mechanism. Additionally, this procedure is only responsive to vehicle yaw rate and does not account for steering rate.

Another common procedure for improving steering stability involves the exertion of a variable amount of return torque to a vehicle steering shaft according to the steering angle of the steering shaft, or according to both the steering angle and the forward velocity of the vehicle. However, this procedure for steering correction is limited to adjustment of the return torque, i.e., the torque exerted on the steering shaft in the direction for returning the steering wheel to a straight ahead position. Additionally, this procedure is only responsive to vehicle velocity and steering angle, and does not assist the driver in unfamiliar safety critical situations, such as while a vehicle is slipping or skidding from the intended direction of travel or when slipping is imminent.

Other steering assist systems control the degree or amount of power assistance in response to the velocity of the vehicle and the angular velocity of the steering wheel. Additionally, it is common to vary power assist to effect variable steering efforts; thus, making it possible to reduce the steering efforts at low vehicle speeds, e.g., in vehicle parking situations, and increase the steering effort as the vehicle speed increases. However, these steering assist procedures do not assist the driver in unfamiliar safety critical situations.

Accordingly, there is a need for a steering assist system which provides improved vehicle steering in unfamiliar safety critical situations and which does not require supplemental steering motors or actuators.

SUMMARY OF THE INVENTION

This need is met by the present invention wherein a method and apparatus are provided for improving vehicle steering in unfamiliar safety critical situations by controlling power steering assist in response to the slip angle of the vehicle and the steering rate of the vehicle. In particular, when a vehicle is in a slide or a slide is imminent, the steering wheel should be turned in the direction of the slide to stabilize the vehicle and take the vehicle out of the slide or prevent a slide from occuring. In accordance with the present invention, a positive supplemental steering assist is provided for the steering system if the driver is turning the steering wheel in the direction to correct the slide. If, on the other hand, the driver is turning the steering wheel in the direction which will cause or increase a slide, a negative supplemental assist is provided for the steering system. That is, a feedback is provided to the driver in the form of increased steering assist if the steering wheel is being turned in the proper direction and a decreased steering assist if the steering wheel is being turned in the improper direction. In this way, the driver of a motor vehicle is advised of the proper steering action to take in the event of an actual or imminent vehicle slide by the resistance the driver feels in turning the steering wheel.

More particularly, in an illustrative embodiment of the invention, the steering rate of a steering wheel of the vehicle is measured and combined with a vehicle slip angle which is measured or estimated by combining other vehicle operating parameters, such as forward velocity, lateral acceleration and yaw rate. Preferably, all necessary parameters for performing the steering assistance of the present invention are already available from one or more existing operating systems of the vehicle. In one embodiment of the invention, lateral acceleration of the vehicle is divided by the forward velocity to generate a reference yaw rate. The reference yaw rate is compared to a measured yaw rate to generate a yaw rate error signal which is integrated and filtered to generate a signal representative of vehicle slip angle. While vehicle slip angle can be directly measured, available measurement devices are expensive such that calculation is currently the preferred form of the invention. In any event, the vehicle slip angle is compared to positive and negative thresholds to generate a signed increasing slip angle signal which is then multiplied by a signed steering rate signal to generate a signed supplemental steering assist value which is algebraically combined with a base assist steering value.

In accordance with one aspect of the present invention, a method for controlling power steering assist in a motor vehicle including a power steering system comprises the steps of: determining a slip angle of a vehicle; determining a steering rate of the vehicle; combining the slip angle with the steering rate; and, controlling steering assist provided by the power steering system of the vehicle based on the combination of the slip angle and the steering rate.

In accordance with another aspect of the present invention, an apparatus for controlling power steering assist in a motor vehicle including a power steering system comprises a slip angle sensor for generating a vehicle slip angle signal, and a steering rate sensor for generating a steering rate signal for a steering wheel of the vehicle. A multiplier is connected to the slip angle sensor and the steering rate sensor for generating a supplemental assist signal in response to the slip angle signal and the steering rate signal. A base power steering assist unit generates a base assist signal. An adder is connected to the multiplier and the base power steering assist unit for combining the supplemental assist signal and the base assist signal to generate a control signal for the power steering system of the vehicle. The slip angle sensor may comprise a threshold detector.

In accordance with yet another aspect of the present invention, a method for controlling power steering assist in a motor vehicle including a power steering system comprises the steps of: determining a signed slip angle for a motor vehicle; comparing the signed slip angle to positive and negative thresholds to generate a positive or a negative slip angle signal corresponding in magnitude to the extent the slip angle exceeds the thresholds; measuring a steering rate for a steering wheel of the motor vehicle; generating a signed steering rate signal representative of the directional steering rate of the steering wheel of the motor vehicle; and, multiplying the signed slip angle signal by the signed steering rate signal to generate a steering control signal for controlling steering system power assist. The steering control signal may be algebraically combined with a base steering control signal.

Accordingly, it is a feature of the present invention to provide a method and apparatus for controlling power steering assist which is responsive to both vehicle slip angle and steering rate, as opposed to merely being responsive to vehicle speed, yaw rate, or steering angle.

It is a further feature of the present invention to provide a method and apparatus which encourages steering correction utilizing the existing power steering system, as opposed to additional steering system motors or actuators.

These and other features and advantages of the present invention will be apparent from the following description, the accompanying drawings, and the appended claims.

DETAILED DESCRIPTION OF THE INVENTION

Figure 1A:
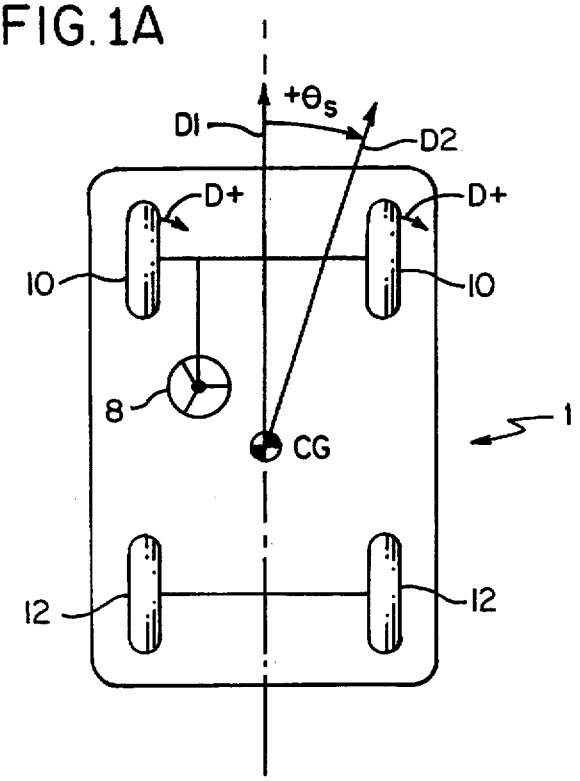
FIGS. 1A–1D schematically illustrate a motor vehicle including front wheels, rear wheels, and direction of travel of the vehicle.
Figure 1B:
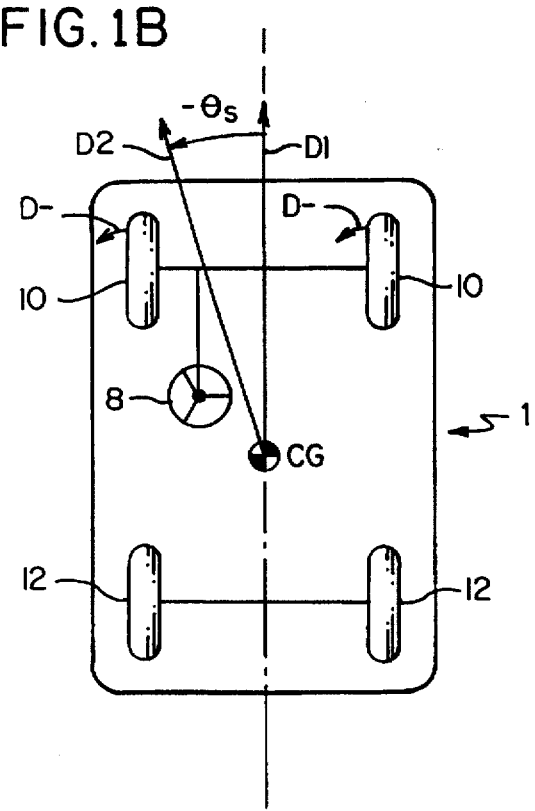

FIGS. 1A–1D schematically illustrate a motor vehicle 1 having front wheels 10, rear wheels 12, and a steering wheel 8. In FIGS. 1A and 1B, the centerline of the vehicle 1 defines a forward vehicle direction D1. As the vehicle 1 is operated, various forces cause the actual direction of the center of gravity CG of the vehicle 1 to deviate from the forward vehicle direction D1 and move in a direction D2. The angle between the forward vehicle direction D1 and the direction D2 of the vehicle center of gravity CG is the vehicle slip angle $+\theta_s$, $-\theta_s$.

In the event of poor road conditions, insufficient traction, excessive rates of vehicle speed or turning rate, and the like, the slip angle may become excessive resulting in a vehicle slip or skid. The slip angle $+\theta_s$, illustrated in FIG. 1A is in a positive signed direction with respect to the forward vehicle direction D1. The slip angle $-\theta_s$, illustrated in FIG. 1B is in a negative signed direction with respect to the forward vehicle direction D1.

When a vehicle slips or skids, in order to regain control, it is preferable to turn the front wheels 10 in the direction of the vehicle slip. Thus, in the situation illustrated in FIG. 1A, it is preferable to turn the steering wheel 8 and the front wheels 10 in a positive direction D+. In the situation illustrated in FIG. 1B, it is preferable to turn the steering wheel 8 and the front wheels 10 in a negative direction D−.

Figure 2:
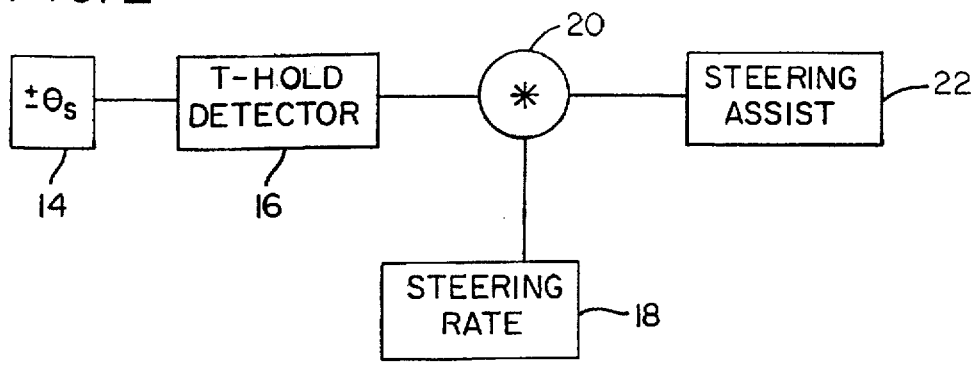
FIG. 2 is a schematic block diagram of a steering assist system according to one embodiment of the present invention.

The present invention, as illustrated in FIG. 2, controls a power steering assist signal to encourage turning the steering wheel 8 in the direction of vehicle slip, and thus to correct an imminent or existing slide. A signed slip angle $+\theta_s$, $-\theta_s$ of a motor vehicle is determined by a slip angle sensor 14, such a sensor is available from Datron-Messtechnik, GmbH, Germany. The signed slip angle value is compared to positive and negative thresholds in a threshold detector 16 to generate a positive or a negative slip angle signal corresponding in magnitude to the extent the slip angle exceeds the thresholds. A currently preferred threshold value is about ±2°–3°. If the absolute value of a positive or negative slip angle $+\theta_s$, $-\theta_s$ is less than the absolute value of the threshold value, the slip angle signal will be zero.

A steering rate is measured by a conventional steering rate sensor 18 and a signed steering rate signal is generated representative of the directional steering rate of the steering wheel 8, and consequently the front wheels 10, of the motor vehicle 1. The sign, positive or negative, of the steering rate signal indicates the direction in which the front wheels 10 are turning and the magnitude of the steering rate signal indicates the rate at which the front wheels are turning. A mechanism for measuring a directional steering rate is disclosed in U.S. Pat. No. 4,837,692 to which a reader can refer for additional detail.

The signed slip angle signal and the signed steering rate signal are combined in multiplier 20 to generate a steering control signal which is passed to a steering assist unit 22 for controlling the assist level in a power steering system of the vehicle 1. If the steering control signal is negative, steering assist will decrease. If the steering control signal is positive, steering assist will increase.

Thus, if a vehicle is slipping in a positive direction and if the wheels are being turned in the positive direction, as illustrated in FIG. 1A, steering assist will increase, encouraging a driver of the vehicle to continue turning the wheels in the proper direction. Similarly, if a vehicle is slipping in a negative direction, and if the wheels are being turned in the negative direction, as illustrated in FIG. 1B, steering assist will increase, encouraging a driver of the vehicle to continue turning the wheels in the proper direction.

Figure 1C:
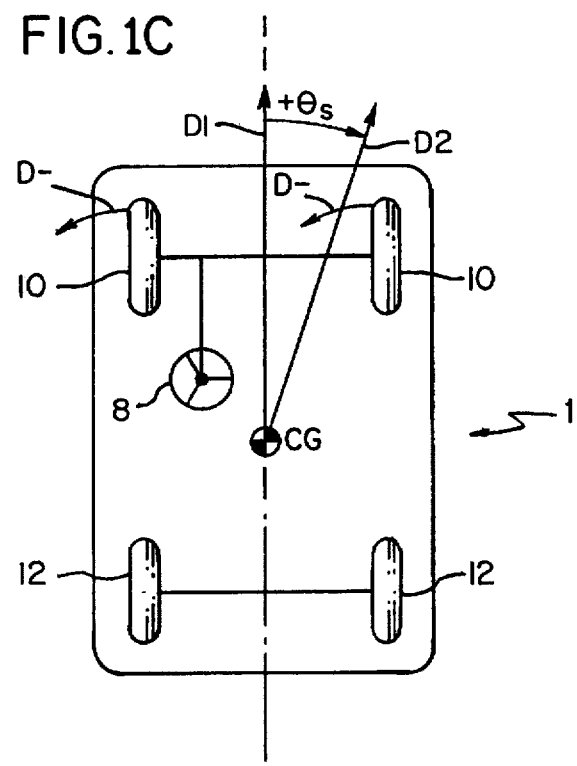

FIG. 1C illustrates a situation where the vehicle 1 is slipping in a positive direction and the front wheels 10 are being turned in the negative direction. In this situation, the signed slip angle signal will have a positive value and the steering rate signal will have a negative value. As a result, the steering control signal will have a negative value and the steering assist will decrease, encouraging a driver of the vehicle 2 to discontinue turning the wheels 10 in the improper direction.

The amount of increase or decrease in steering assist may be a fixed value or a value which is proportional to the severity of the vehicle slide or to the absolute value of the steering rate signal. For example, by assigning a value to the slip angle which is proportional to the size of the slip angle and assigning a value to the steering rate which is proportional to the rate at which a steering direction is changed, a proportional steering assist value is generated which accounts for varying degrees of criticality in different situations. For example, if a driver is steering a vehicle in the wrong direction at a low steering rate, a relatively small decrease in steering assist will be provided. On the other hand, if a driver is steering the vehicle in the wrong direction at a high steering rate, a relatively large decrease in steering assist will be provided to more adequately counter the erroneous steering. Similarly, high slip angles will produce greater increases or decreases in steering assist than low slip angles.

Figure 3:
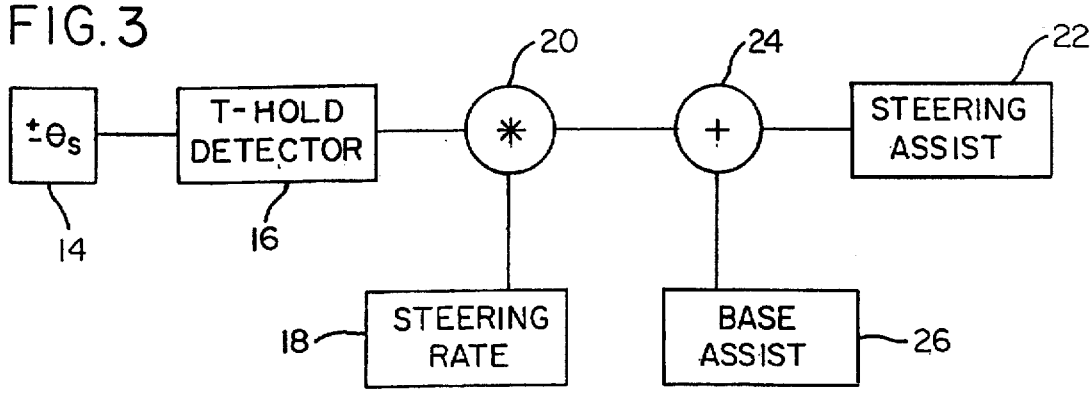
FIG. 3 is a schematic block diagram of a steering assist system according to another embodiment of the present invention.

FIG. 3 illustrates an embodiment wherein a supplemental steering assist value is combined with a base steering assist value to generate a control signal for the power steering system of the vehicle 1. The supplemental assist value is generated in response to signals produced by the slip angle sensor 14, the threshold detector 16, the steering rate sensor 18, and the multiplier 20 in the same manner the steering control signal is generated in the FIG. 2 embodiment. However, in the FIG. 3 embodiment, the supplemental assist signal is algebraically combined in adder 24 with a base steering assist signal from a base power steering assist unit 26 to generate a steering control signal for steering assist unit 22 to control the assist level in a power steering system of the vehicle 1.

By combining the supplemental assist with the base assist, the amount of steering assist will be increased when the supplemental assist value is positive, decreased when the supplemental assist value is negative, and maintained at the base assist level when the supplemental assist value is zero. Thus, the amount of increased steering assist is proportional to a positive supplemental assist value or signal and the amount of decreased steering assist is proportional to a negative supplemental assist value or signal.

The base assist unit 26 represents a conventional motor vehicle steering assist control unit. As such, the supplemental assist value may be combined with a steering assist value from a conventional steering assist control unit to generate the steering control signal of the present invention. In this manner, the steering control of the present invention is achieved without the necessity of an additional steering assist motor or power steering actuator, and may be incorporated into conventional power steering systems, either electric or hydraulic, which operate in response to a steering assist control signal. A variety of appropriate power steering systems are available in the art and, accordingly, will not be described further herein.

Figure 1D:
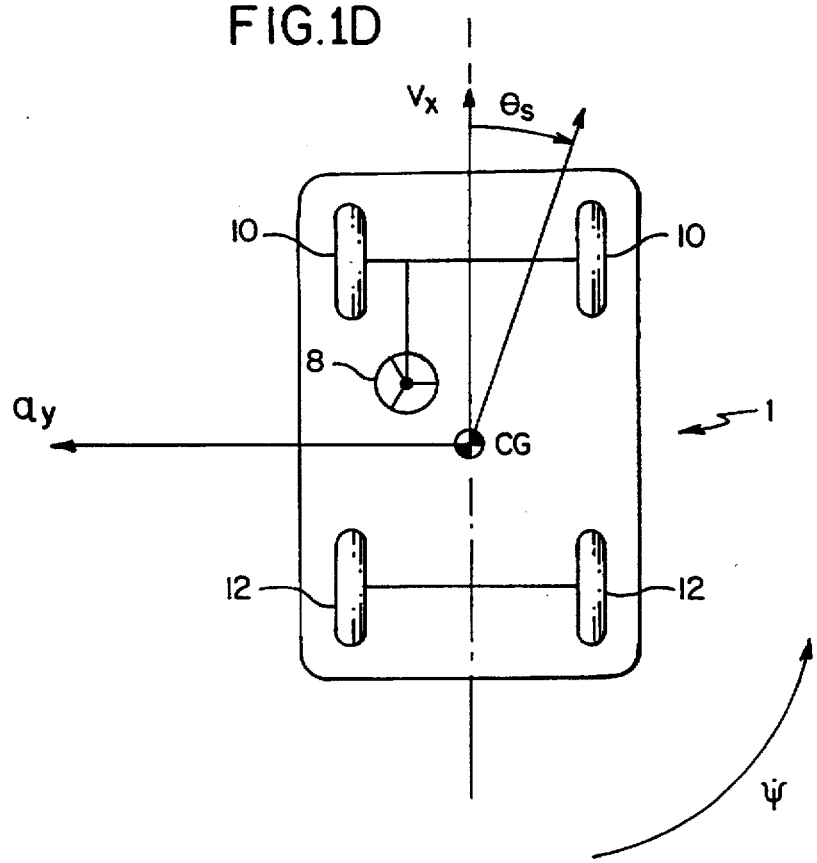
Figure 4:
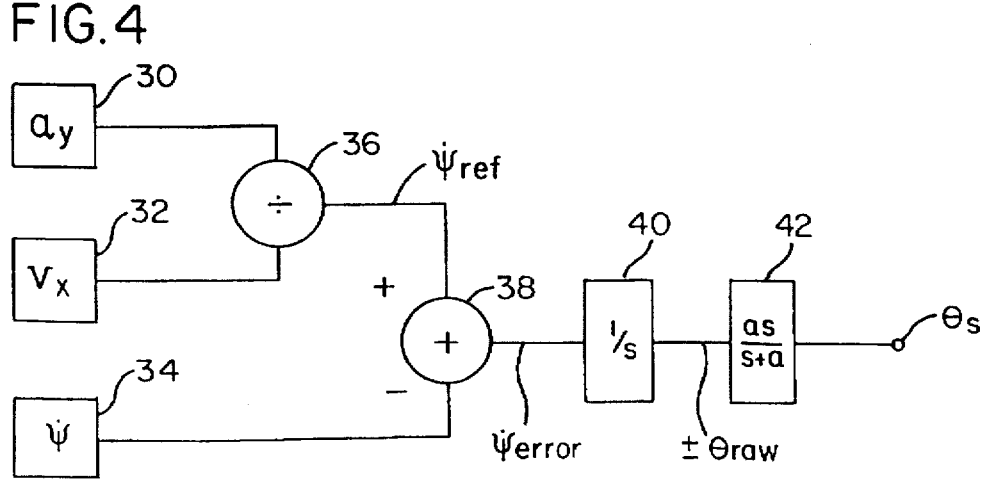
FIG. 4 is a schematic block diagram of a circuit arrangement for calculating a vehicle slip angle which can be used in the present invention.

FIGS. 1D and 4 illustrate an embodiment wherein the signed slip angle $\theta_s$ of the motor vehicle 1 is determined from a calculation. As illustrated, the signed slip angle $\theta_s$ is calculated by measuring lateral acceleration $a_y$ of the vehicle 1 with a conventional accelerometer 30, measuring forward velocity $v_x$ of the vehicle 1 with a conventional speed sensor 32, and measuring the actual yaw rate $\dot{\psi}$ of the vehicle 1 with a conventional yaw rate sensor 34. Lateral acceleration $a_y$ is divided by forward velocity $v_x$ in divider 36 to define a reference yaw rate $\dot{\psi}_{ref}$ for the vehicle 1. The difference between the reference yaw rate $\dot{\psi}_{ref}$ and the actual yaw rate $\dot{\psi}$ is determined by an adder 38 to define a yaw rate error $\dot{\psi}_{error}$. The yaw rate error $\dot{\psi}_{error}$ is then integrated by an integrator 40 to define a raw slip angle $\pm\theta_{raw}$ which is subsequently filtered through a high pass filter 42 to define a signed slip angle $\theta_s$.

The integrator 40 preferably has a characteristic defined by $(1/s)$, where s is the Laplace operator. The high pass filter 42 preferably has a characteristic defined by $\{(as)/(s+a)\}$, where a is a constant and s is the Laplace operator, and passes frequencies above about 0.1 to 0.5 hertz to attenuate long term error and eliminate D.C. error in the raw slip angle signal $\pm\theta_{raw}$. The yaw rate sensor 34 measures the rate of rotation of the vehicle 1 about a vertical axis and may comprise a gyroscope or the combination of conventional front and rear lateral acceleration sensors, as described in U.S. Pat. No. 4,941,097.

Having described the invention in detail and by reference to preferred embodiments thereof, it will be apparent that modifications and variations are possible without departing from the scope of the invention defined in the appended claims.

What is claimed is:

1. A method for controlling power steering assist in a motor vehicle including a power steering system, said method comprising the steps of:

determining a slip angle of the vehicle;
   determining a steering rate of the vehicle;
   combining said slip angle with said steering rate; and
   controlling steering assist provided by the power steering system of the vehicle based on the combination of said slip angle and said steering rate.

2. A method for controlling power steering assist as claimed in claim 1 wherein the step of determining a slip angle of a motor vehicle comprises the step of calculating said slip angle.

3. A method for controlling power steering assist as claimed in claim 2 wherein the step of calculating said slip angle comprises the steps of:

measuring lateral acceleration of the vehicle;
   measuring forward velocity of the vehicle;
   dividing said lateral acceleration by said forward velocity to define a reference yaw rate for the vehicle;
   determining an actual yaw rate of the vehicle;
   comparing said reference yaw rate to said actual yaw rate to define a yaw rate error;
   integrating the yaw rate error to define a raw slip angle; and
   filtering the raw slip angle through a high pass filter to define said slip angle.

4. A method for controlling power steering assist as claimed in claim 3 wherein the step of comparing said reference yaw rate to said actual yaw rate comprises the step of determining the difference between said reference yaw rate and said actual yaw rate.

5. A method for controlling power steering assist as claimed in claim 1 wherein the step of determining a slip angle of the vehicle comprises the step of measuring the vehicle slip angle.

6. A method for controlling power steering assist as claimed in claim 1 wherein the step of controlling steering assist comprises the steps of:

determining a supplemental assist value from the combination of said slip angle and said steering rate; and
   algebraically combining said supplemental assist value and a base assist value.

7. A method for controlling power steering assist as claimed in claim 1 wherein said step of combining said slip angle and said steering rate comprises the steps of:

assigning a value to said slip angle proportional to the size of the slip angle;
   assigning a value to said steering rate proportional to the rate at which a steering direction is changed; and
   multiplying said slip angle value by said steering rate value to obtain a supplemental assist value.

8. A method for controlling power steering assist as claimed in claim 7 wherein a negative slip angle value corresponds to a vehicle slip in a first direction, a positive slip angle value corresponds to a vehicle slip in a second direction opposite to said first direction, a negative steering rate value corresponds to turning a steering wheel in said first direction, and a positive steering rate value corresponds to turning said steering wheel in said second direction.

9. A method for controlling power steering assist as claimed in claim 8 wherein the step of combining said slip angle and said steering rate further comprises the step of assigning a zero value to said slip angle value if said slip angle value does not exceed a predetermined threshold value.

10. A method for controlling power steering assist as claimed in claim 9 wherein the step of controlling steering assist comprises the steps of:

increasing the amount of steering assist when the supplemental assist value is positive;

decreasing the amount of steering assist when said supplemental assist value is negative; and maintaining a base amount of steering assist when the supplemental assist value is zero.

11. A method for controlling power steering assist as claimed in claim 10 wherein the amount of increased steering assist is proportional to the positive supplemental assist value and wherein the amount of decreased steering assist is proportional to the negative supplemental assist value.

12. Apparatus for controlling power steering assist in a motor vehicle including a power steering system, said apparatus comprising:

a slip angle sensor for generating a vehicle slip angle signal;

a steering rate sensor for generating a steering rate signal for a steering wheel of said vehicle;

a multiplier, connected to said slip angle sensor and said steering rate sensor, for generating a supplemental assist signal in response to said slip angle signal and said steering rate signal;

a base power steering assist unit generating a base assist signal; and an adder, connected to said multiplier and said base power steering assist unit, for combining said supplemental assist signal and said base assist signal to generate a control signal for the power steering system of said vehicle.

13. Apparatus for controlling power steering assist as claimed in claim 12 wherein said slip angle sensor comprises a threshold detector.

14. Apparatus for controlling power steering assist as claimed in claim 12 wherein said slip angle sensor comprises a vehicle slip angle measuring device.

15. Apparatus for controlling power steering assist as claimed in claim 12 wherein said slip angle sensor comprises:

an accelerometer for measuring lateral acceleration of said vehicle;

a speed sensor for measuring forward velocity of said vehicle;

a yaw rate sensor for measuring yaw rate of said vehicle;

a divider connected to said accelerometer and said speed sensor for dividing said lateral acceleration by said forward velocity to generate a reference yaw rate;

an adder connected to said divider and said yaw rate sensor for generating an error yaw rate;

an integrator connected to said adder for integrating said error yaw rate to generate a raw slip angle signal; and a high pass filter connected to said integrator for filtering said raw slip angle signal to generate said slip angle signal.

16. Apparatus for controlling power steering assist as claimed in claim 15 wherein said high pass filter passes frequencies above about 0.1 to 0.5 hertz.

17. A method for controlling power steering assist in a motor vehicle including a power steering system, said method comprising the steps of:

determining a signed slip angle for the motor vehicle;

comparing the signed slip angle to positive and negative thresholds to generate a positive or a negative slip angle signal corresponding in magnitude to the extent the slip angle exceeds said thresholds;

measuring a steering rate for a steering wheel of the motor vehicle;

generating a signed steering rate signal representative of the directional steering rate of the steering wheel of the motor vehicle; and multiplying said signed slip angle signal by said signed steering rate signal to generate a steering control signal for controlling steering system power assist.

18. A method for controlling power steering assist as claimed in claim 17 wherein the step of determining a signed slip angle comprises the steps of:

measuring a signed lateral acceleration of the vehicle;

measuring forward velocity of the vehicle;

dividing said signed lateral acceleration by said forward velocity to define a reference yaw rate of the vehicle;

determining an actual yaw rate of the vehicle;

comparing said reference yaw rate to said actual yaw rate to define a yaw rate error;

integrating the yaw rate error to define a raw slip angle; and filtering the raw slip angle through a high pass filter to define said slip angle.

19. A method for controlling power steering assist as claimed in claim 17 wherein the step of determining a signed slip angle comprises the step of measuring the signed slip angle.

20. A method for controlling power steering assist as claimed in claim 17 wherein said steering control signal is algebraically combined with a base steering control signal.

* * * * *